May 12, 1970   R. M. DYER ET AL   3,511,254
LIQUID CONTROL VALVE
Filed May 18, 1967

INVENTORS
ROBERT DYER
LEONARD J. NOWAK
LEO J. HAULIK
BY
Charles L. Lovercheck
ATTORNEY 3,511,254
LIQUID CONTROL VALVE
Robert M. Dyer, Leonard J. Nowak, and Leo J. Haulik, Erie, Pa., assignors to Hays Manufacturing Company, Erie, Pa., a corporation of Pennsylvania
Filed May 18, 1967, Ser. No. 639,385
Int. Cl. F16k 13/04
U.S. Cl. 137—67                    7 Claims

ABSTRACT OF THE DISCLOSURE

In the present invention, a hollow body having a tapered inside surface is provided with a closure member which is made of a soluble brittle material, so when liquid is turned on in the line the control member will dissolve and the solution of the dissolved member will not contaminate the liquid and render it unpotable.

---

This invention relates to valves and, more particularly, to valves for temporarily preventing the flow of a liquid from a source through the valve.

The principle envisaged in this application is to replace the presently-used ground-key corporation stop which consists of a bronze or brass tapered plug in a matingly tapered body, end pieces being shaped as needed for the patricular pipe sizes and the joints desired. The ground-key stop section is used only once because it is normally subsequently buried under the pavement of a street.

The corporation stop inserted into a water main containing water under pressure (a "main" being a large pipe supplying water to many users along a street) with the stop portion in the closed position. A "service line" from the main to the user is then connected from the coropration stop to a curb stop of similar construction, said curb stop being on the sidewalk side of the curb.

With this much in place, the corporation stop is opened, and enough water is allowed to flow through the curb stop to flush the service line of dirt, drilling chips, etc. The curb stop is then closed, and with the corporation stop still in the open position, the excavation is filled, leaving only the curb stop accessible for future use.

It is, accordingly, an object of the invention to provide an improved automatic release valve.

Another object of the invention is to provide a valve member that is simple in construction, economical to manufacture, and simple and efficient to use.

Another object of the invention is to provide a valve member having a closure made of soluble, brittle material.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figures 1, 3:
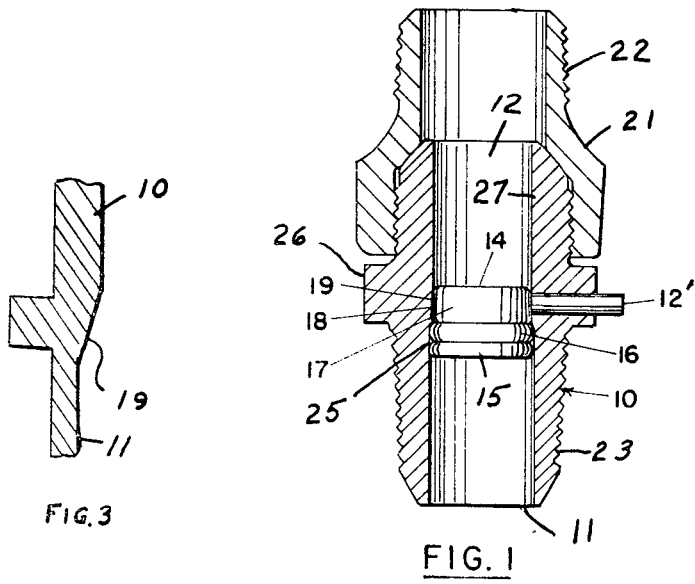
FIG. 1 is a longitudinal cross-sectional view of the valve according to the invention.
FIG. 3 is an enlarged partial cross-sectional view of the valve body.
Figure 2:
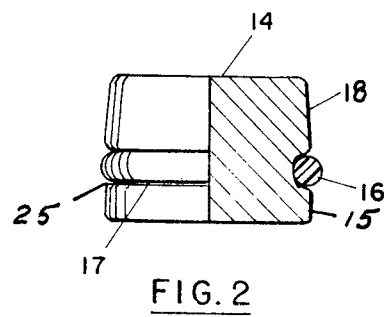
FIG. 2 is a view partly in cross section of the closure member.

Now with more particular reference to the drawings, the valve is made up of a hollow body 10 which may be externally threaded to be used to connect a water line to a water main and to temporarrily prevent flow through the line while the connection is being made to another valve or to a piping system, or it can be used to connect any other suitable means to a fluid line where a temporary shutoff is required. Instead of the threaded ends that are shown by way of example, soldered or brazed connections could be used to connect the valve body 10 in a fluid line. A cap nut 21 may be threaded onto the downstream end of the valve on the external threads shown. Thus, the closure member will rest on the tapered surface at 19, as indicated.

The body 10 has an inlet 11 and an outlet 12. The inlet end 11 has a cylindrical inside surface and the outlet end 12 has an inside diameter slightly smaller than the inlet end 11. The cylindrical inlet 11 terminates in the tapered inside surface 19 extending as from the cylindrical surface of the inlet 11 to the cylindrical surface of outlet 12. The tapered surface 19 is engaged by the frusto-conical end 18 of the closure member 17, which is forced into contact with the tapered surface 19 of the hollow body by the liquid pressure on the upstream end of the closure member.

The closure member has the frusto-conical portion 18 and a generally cylindrical portion 15 integrally connected to the frusto-conical portion and separated from it by a groove 25 in which an O-ring 16 is supported. The major diameter of the frusto-conical portion is approximately equal to the major diameter of tapered surface 19. The frusto-conical edge may taper approximately fifteen degrees to the central axis. The cylindrical surface at the inlet 11 may be approximately .020 inch larger than the maximum diameter of tapered surface 19, with the actual diameter being established by the choice of O-ring. The O-ring 16 forms sealing engagement with the cylindrical inside surface of the valve body. Thus, the pressure of the water from the inlet forces the closure member toward the outlet and into contact with the tapered inside.

The tapered surface 19 inside of the valve forms a seat for the frustoconical end 18, while the O-ring forms a liquid tight seal on cylindrical surface 11. The taper of said surface 19 may be in the range of fifteen degrees to the central axis of the body. The taper in the body puts the brittle closure member in compression, which is the preferred method of stress for a brittle material. Thus, the brittle material will support the high pressure water. The cylindrical portion provides the correct fit for the O-ring.

A tapered pin 12' is supported in a hole in the side of the valve and this may be engaged by a suitable impact tool to crush the closure member when if it is decided to increase its rate of dissolving when the liquid is turned on. The tapered pin 12' seats in the hole preventing leakage along the pin when engaged by this impact tool.

The closure member 17 may be made of a hard candy or other soluble material coated; for example, with a paint so that it will not dissolve until it is cracked and will not render the water unpotable. When the coated closure is cracked, fine water paths flow through the closure. The flow through paths promote rapid dissolving and weakens it until water pressure forces it out into the pipe.

The valve disclosed herein may be used to temporarily close a liquid line, such as a water line that is connected to a water main.

The embodiments of the invention in which an exclusive property or privilege is claimed are defined as follows:

1. A valve comprising:
   a hollow body having an inlet end and an outlet end,
   said hollow body having an inside wall having an inside surface,
   a closure member in said body,
   said closure member having a generally cylindrical part and a frustoconical part integrally attached to said cylindrical part, said cylindrical part being freely received in said hollow body, said frustoconical part resting on said surface, said closure member being made of a material that is soluble in water and coated with a non-soluble coating, a peripheral groove is found in said cylindrical part, a resilient sealing washer in the form of an O-ring in said groove, said body has a cylindrical surface slightly larger than said surface, said sealing washer sealingly engaging said cylindrical surface.

2. A valve for temporarily stopping the flow of a liquid from a source through a flow line comprising:

a hollow body having an inlet end adapted to be connected to said source and an outlet end, said hollow body having a surface therein between said inlet and said outlet, a closure member in said hollow body, said closure member having a tapered end, said tapered end resting on said surface, a peripheral groove in said closure member, a sealing washer in the form of an O-ring in said groove, said sealing washer making sealing engagement with the inside surface of said body thereby preventing flow between said closure and the inside surface of said body, said closure member being made of an edible material that is dissolvable in the fluid said line is adapted to carry and coated with a non-soluble coating.

3. The valve recited in claim 2 wherein said body has a generally cylindrical part integrally attached to said tapered end, and said sealing washer is in said generally cylindrical part.

4. A valve for temporarily stopping the flow of a liquid from a source through a flow line comprising:

a hollow body having an inlet end adapted to be connected to said source and an outlet end, said hollow body having a surface therein between said inlet and said outlet, a closure member in said hollow body, said closure member having a tapered end, said tapered end resting on said surface, a peripheral groove in said closure member, a sealing washer in the form of an O-ring in said groove, said sealing washer making sealing engagement with the inside surface of said body thereby preventing flow between said closure and the inside surface of said body, said closure member being made of an edible material that is dissolvable in the fluid said line is adapted to carry, said hollow body has a hole in one side thereof, a tapered pin is disposed in said hole, one end of said pin engages said closure member, the opposite end extends outside said body and is adapted to be engaged by an impact member to break said closure member.

5. The valve recited in claim 4 wherein said edible material is a hard candy-like material.

6. The valve recited in claim 5 wherein the outside of each end of said hollow body has a male thread thereon.

7. A valve for temporarily stopping the flow of a liquid from a source through a flow line comprising:

a hollow body having an inlet end adapted to be connected to said source and an outlet end, said hollow body having a surface therein between said inlet and said outlet, a closure member in said hollow body, means to prevent said closure member from moving in said hollow body, a peripheral groove in said closure member, a sealing washer in said groove, said sealing washer making sealing engagement with the inside surface of said body thereby preventing flow between said closure and the inside surface of said body, said closure member being made of a potable material that is dissolvable in the fluid said line is adapted to carry, said hollow body having a hole in one side thereof, said closure being coated with a non-soluble coating, a tapered pin being disposed in said hole, one end of said pin being disposed adjacent said surface, the opposite end extending outside said body and being adapted to be engaged by an impact member to break said closure.

References Cited

UNITED STATES PATENTS

| 2,180,605 | 11/1939 | Otis | 137—67 XR |
|---|---|---|---|
| 2,223,509 | 12/1940 | Braver | 137—67 |
| 2,347,204 | 4/1944 | Lindsay | 137—67 |

WILLIAM F. O'DEA, Primary Examiner

R. GERARD, Assistant Examiner

U.S. Cl. X.R.

138—89